(12) United States Patent
Gosselin et al.

(10) Patent No.: US 10,814,447 B2
(45) Date of Patent: Oct. 27, 2020

(54) COOLING SYSTEM AND METHOD FOR MACHINE TOOLS

(71) Applicants: James Gosselin, Southampton, MA (US); Jake Hagelstein, Westfield, MA (US)

(72) Inventors: James Gosselin, Southampton, MA (US); Jake Hagelstein, Westfield, MA (US)

(73) Assignee: James Gosselin, South Hampton, MA (US)

( * ) Notice: Subject to any disclaimer, the term of this patent is extended or adjusted under 35 U.S.C. 154(b) by 166 days.

(21) Appl. No.: 15/631,091

(22) Filed: Jun. 23, 2017

(65) Prior Publication Data

US 2018/0369976 A1 Dec. 27, 2018

(51) Int. Cl.
*B23Q 11/10* (2006.01)
*B23B 31/02* (2006.01)
(Continued)

(52) U.S. Cl.
CPC .......... *B23Q 11/1023* (2013.01); *B23B 29/04* (2013.01); *B23B 31/02* (2013.01); *B23B 31/028* (2013.01); *B23B 31/1075* (2013.01); *B23B 31/4073* (2013.01); *B23D 59/025* (2013.01); *B23Q 11/1084* (2013.01); *B23B 2231/04* (2013.01); *B23B 2231/24* (2013.01); *B23B 2260/042* (2013.01); *B23Q 15/18* (2013.01); *Y10T 279/17538* (2015.01);
(Continued)

(58) Field of Classification Search
CPC . Y10T 408/44; Y10T 408/45; Y10T 408/453; Y10T 408/455; Y10T 408/458; Y10T 408/46; Y10T 409/303976; Y10T 279/3487; Y10T 279/17299; Y10T 279/17504; Y10T 279/17538; B23Q 11/10; B23Q 11/1023; B23B 31/006; B23B 31/028
USPC ............ 409/136; 408/56, 57, 58, 59, 60, 61; 279/42, 48, 52, 156
See application file for complete search history.

(56) References Cited

U.S. PATENT DOCUMENTS 4,213,354 A * 7/1980 Dahinden ............ B23Q 11/005
407/11
5,358,360 A * 10/1994 Mai ..................... B23Q 11/1084
279/20
(Continued)

FOREIGN PATENT DOCUMENTS

DE 102010028561 A1 * 11/2011 ......... B23Q 11/1023
DE 102014200582 A1 * 7/2015 ......... B23B 31/1179

*Primary Examiner* — Erica E Cadugan
*Assistant Examiner* — Michael Vitale
(74) *Attorney, Agent, or Firm* — Grogan, Tuccillo & Vanderleeden, LLP

(57) ABSTRACT

A clamping system for machine tools includes a body portion configured to be received in a holding fixture of a machine, a tool holder integrally formed with and extending longitudinally from the body portion, the tool holder having a mounting mechanism on a distal end thereof for receiving a cutting tool, at least one fluid delivery vein extending through the tool holder from the body portion to the distal end of the tool holder, and at least one outlet at the distal end of the tool holder, the at least one outlet being configured to direct a fluid from the at least one fluid delivery vein toward at least one of the cutting tool and a workpiece.

13 Claims, 18 Drawing Sheets

(51) Int. Cl.
    *B23B 31/40*     (2006.01)
    *B23D 59/02*     (2006.01)
    *B23B 31/107*     (2006.01)
    *B23B 29/04*     (2006.01)
    *B23Q 15/18*     (2006.01)

(52) U.S. Cl.
    CPC ........ *Y10T 279/3487* (2015.01); *Y10T 408/45* (2015.01); *Y10T 409/30952* (2015.01); *Y10T 409/304032* (2015.01)

(56) References Cited

U.S. PATENT DOCUMENTS

| | | | | |
|---|---|---|---|---|
| 5,405,220 | A * | 4/1995 | Ishikawa | B23B 31/202 |
| | | | | 279/20 |
| 7,156,589 | B2 * | 1/2007 | Sugata | B23Q 1/0018 |
| | | | | 408/59 |
| 7,785,046 | B2 * | 8/2010 | Beckington | B23B 31/02 |
| | | | | 279/20 |
| 8,083,445 | B2 * | 12/2011 | Hyatt | B23B 31/02 |
| | | | | 408/58 |
| 2014/0099171 | A1 * | 4/2014 | Gosselin | B23B 31/006 |
| | | | | 409/234 |
| 2015/0283627 | A1 * | 10/2015 | Borapura | B23B 31/305 |
| | | | | 279/20 |
| 2018/0369976 | A1 * | 12/2018 | Gosselin | B23B 29/04 |

\* cited by examiner

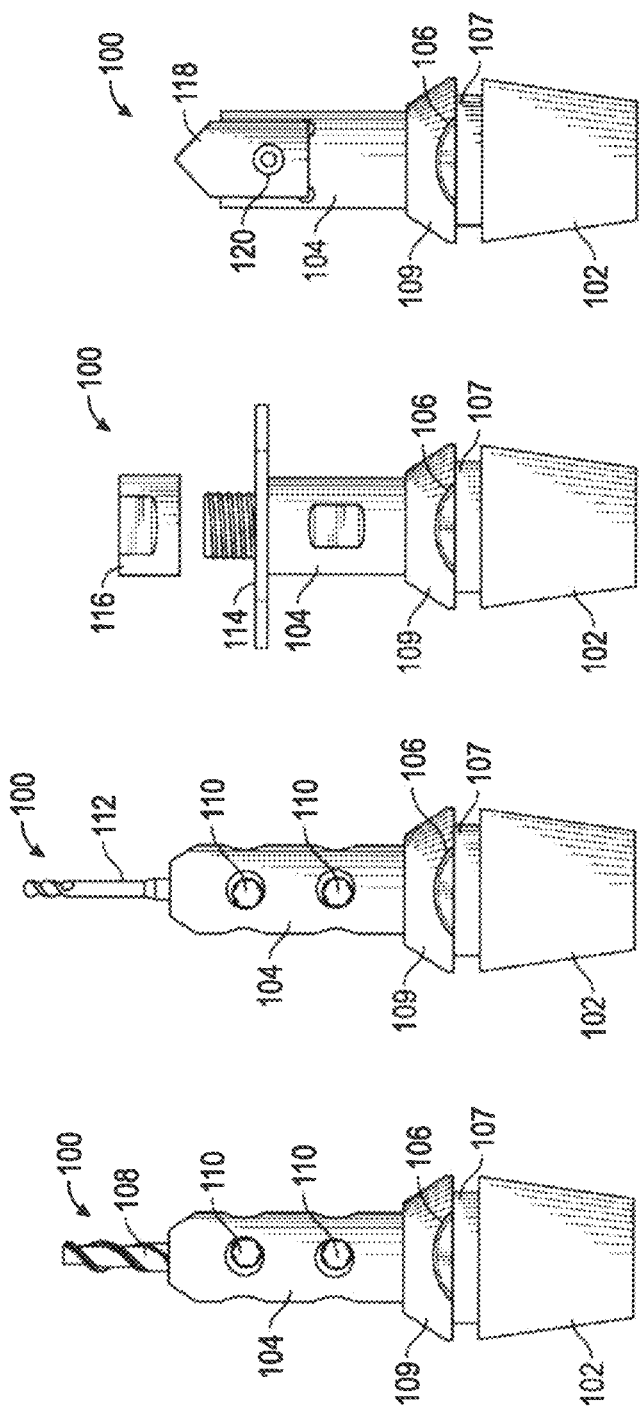

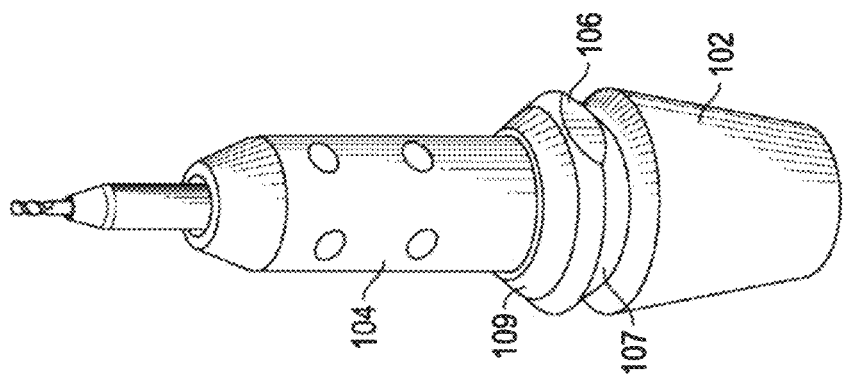
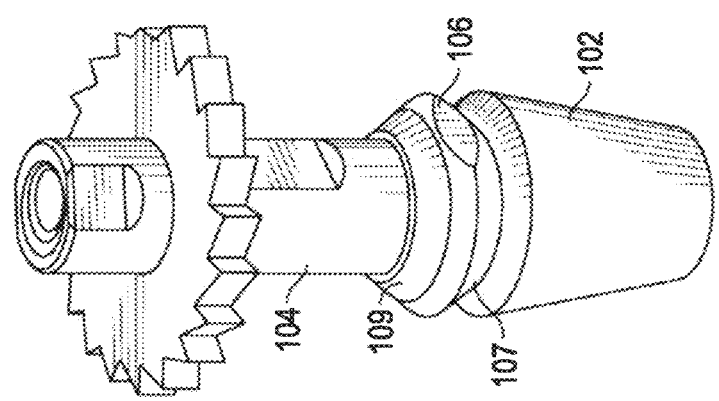
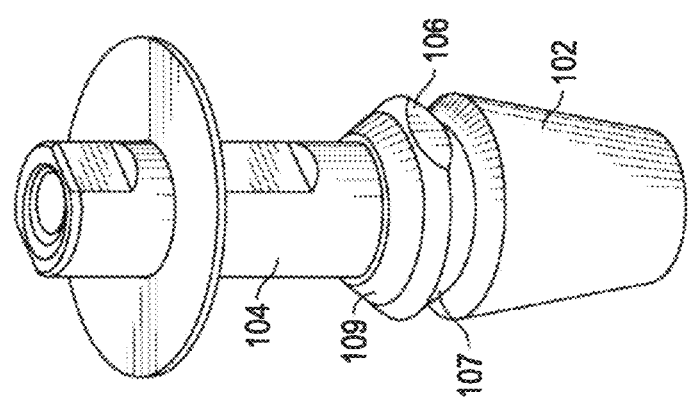

FIG. 2.1

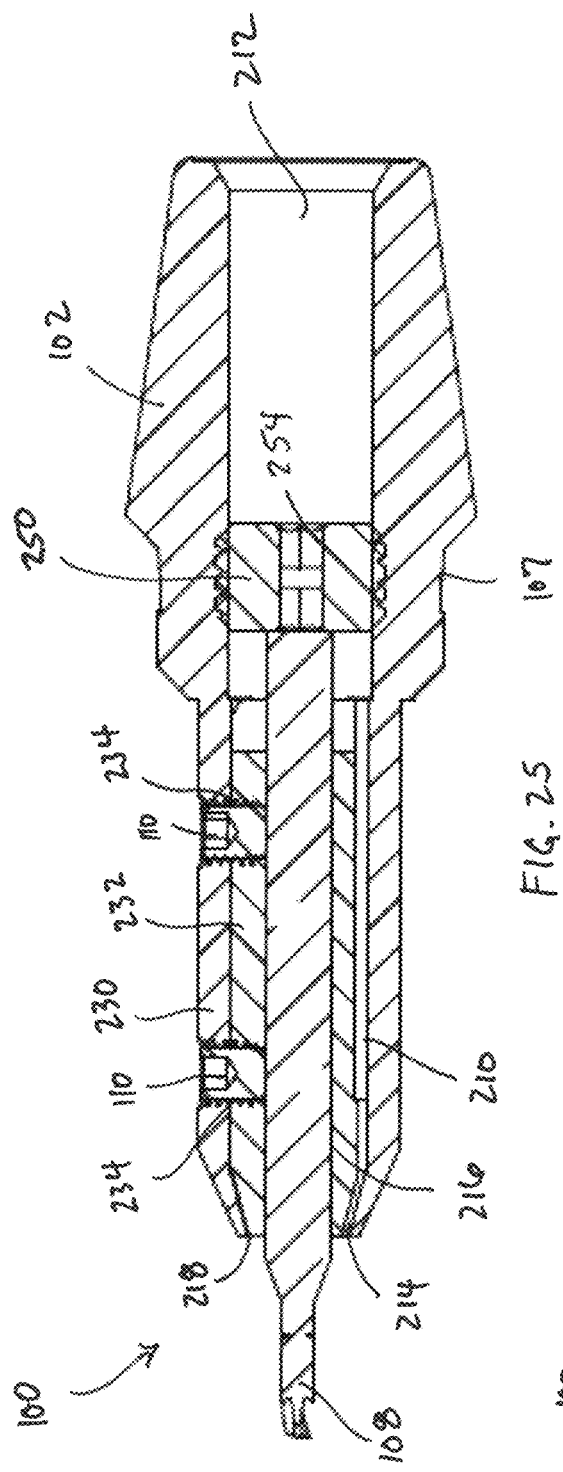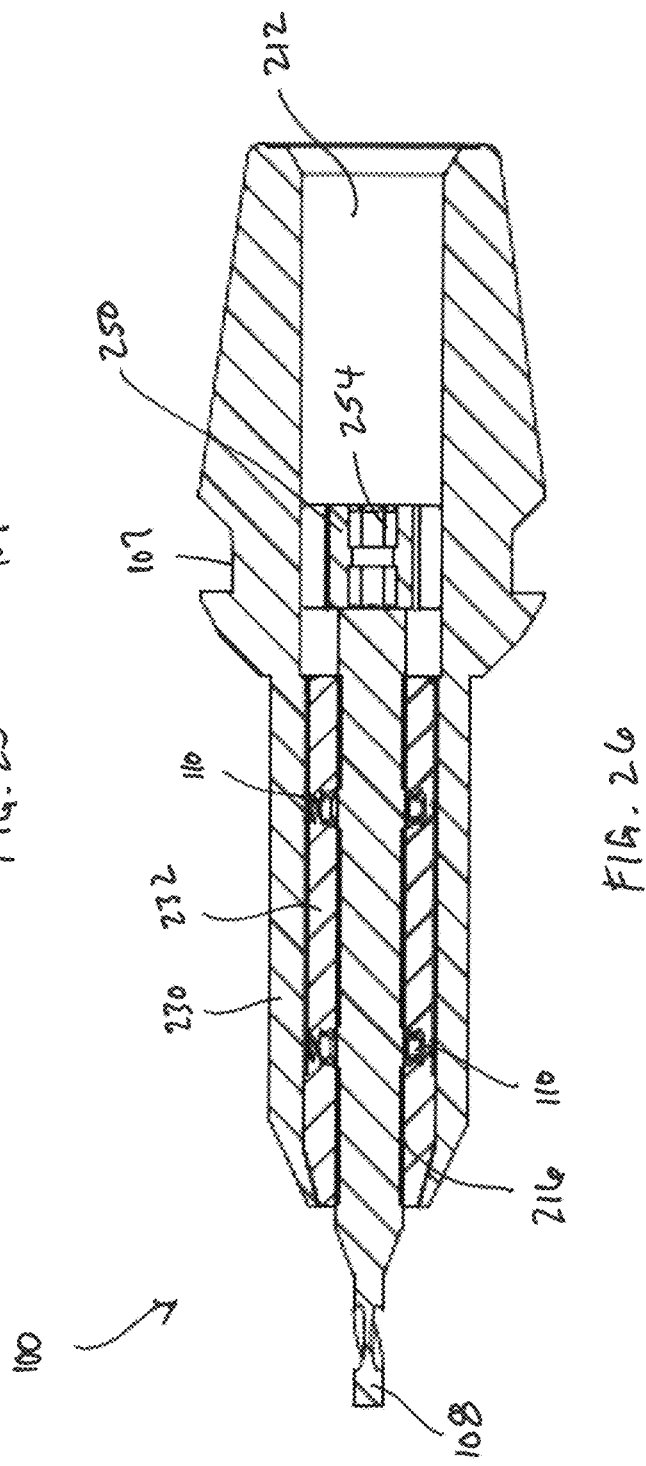

COOLING SYSTEM AND METHOD FOR MACHINE TOOLS

FIELD OF THE INVENTION

The present invention relates generally to machine tools and, more particularly, to a cooling system for machine tools having an integrated clamping system.

BACKGROUND OF THE INVENTION

A machine tool is a machine for shaping and machining metal or other rigid materials, usually by cutting, boring, grinding, shearing and other forms of deformation. Examples of common machine tools include CNC machining centers and lathes. The cutting/machining of a workpiece may be carried out using a variety of cutting tools, such as end mills, boring bars, saw arbors and inserts.

Most existing cutting tools typically have a round shank which is clamped in a tool holder by means of a suitable collet chuck or clamping sleeve. While existing clamping systems for cutting tools for use with machine tools are generally suitable for what is regarded as ordinary performance, there is room for improvement in terms of accuracy, rigidity, repeatability and quick change of tools. In particular, various known clamping systems consist of multiple components that can flex or move as a result of vibration during operation, which provides for less then optimal rigidity and which can lead to decreased tool life. Moreover, as a result of these multiple components, tolerance stack-up can become an issue, decreasing accuracy.

In addition to issues related to vibration, tool loosening, and tool changeover due to numerous, complex component parts of the clamping system, certain workpiece materials and cutting operations are difficult to carry out accurately and at a high production rate. Accordingly, many existing machine tools employ some type of coolant system that provides a cutting fluid or lubricant, typically oil, to the workpiece in order to maintain the workpiece at a stable temperature, maximize the life of the cutting tool by lubricating the working edge and reducing tip welding, and to prevent rust on machine parts and cutters. For example, through-tool coolant systems, also known as through-spindle coolant systems, are systems plumbed to deliver coolant through passages inside the spindle and through the tool, directly to the cutting interface. Many of these are also high-pressure coolant systems, in which the operating pressure can be hundreds to several thousand psi.

While existing coolant and lubrication systems for machine tools are generally suitable for what is regarded as ordinary performance in connection with existing clamping systems, there is room for improvement in terms of coolant/lubricant delivery for integrated clamping systems that provide for accuracy, rigidity, repeatability and quick change of tools, and which enables high production/cutting rates.

SUMMARY OF THE INVENTION

It is an object of the present invention to provide a cooling system and method for machine tools.

It is another object of the present invention to provide a cooling system and method for machine tools having an integrated clamping system.

It is another object of the present invention to provide a cooling system and method for machine tools having an integrated clamping system that provides a reduction in cutting time as a result of increased tool rigidity and coolant delivery to the tool-workpiece interface.

It is another object of the present invention to provide a cooling system and method system for machine tools having an integrated clamping system that provides for increased tool life.

It is yet another object of the present invention to provide a cooling system and method for an integrated clamping system for use with Swiss-type lathes, milling machines and turning machines, such as CNC machine centers and CNC turning centers, requiring both powered rotating tools and static tool operations.

These and other objects are achieved by the present invention.

According to an embodiment of the present invention, a clamping system for machine tools includes a body portion configured to be received in a holding fixture of a machine, a tool holder integrally formed with and extending longitudinally from the body portion, the tool holder having a mounting mechanism on a distal end thereof for receiving a cutting tool, at least one fluid delivery vein extending through the tool holder from the body portion to the distal end of the tool holder, and at least one outlet at the distal end of the tool holder, the at least one outlet being configured to direct a fluid from the at least one fluid delivery vein toward at least one of the cutting tool and a workpiece.

According to another embodiment of the present invention, a clamping system for machine tools is provided. The clamping system includes a body portion configured to be received in a holding fixture of a machine, a tool holder integrally formed with and extending longitudinally from the body portion, the tool holder having a mounting bore in a forward facing end thereof for receiving a cutting tool, a plurality of fluid delivery veins extending through the tool holder from the body portion to the forward facing end, and a plurality of outlets in the forward facing end, each of the outlets corresponding to a respective one of the fluid delivery veins. The outlets are configured to direct a flow of fluid from the fluid delivery veins in a direction generally towards an interface between the cutting tool and a workpiece.

According to yet another embodiment of the present invention, a method for manufacturing a clamping system for machine tools is provided. The method includes the steps of utilizing an additive manufacturing processing, integrally forming a tool holder with a body portion, the body portion being configured to be received in a holding fixture of a machine and the tool holder extending longitudinally from the body portion and having a mounting bore on a distal end thereof for receiving a cutting tool, and with the additive manufacturing process forming at least one fluid delivery vein within the tool holder that extends through the tool holder from the body portion to the distal end of the tool holder.

BRIEF DESCRIPTION OF THE DRAWINGS

The present invention will be better understood from reading the following description of non-limiting embodiments, with reference to the attached drawings, wherein below:

FIG. 1 illustrates an integrated clamping system having an end mill, in accordance with an embodiment of the present invention.

FIG. 2 illustrates an integrated clamping system having a, drill in accordance with an embodiment of the present invention.

FIG. 3 illustrates an integrated clamping system having a saw arbor, in accordance with an embodiment of the present invention.

FIG. 4 illustrates an integrated clamping system having an insert tool, in accordance with an embodiment of the present invention.

FIGS. 5A-5C illustrates the integrated clamping system being used in combination with a variety of cutting tools.

FIG. 25 is a cross-sectional view of the integrated clamping system having an integral coolant delivery barrel, taken along line A-A of FIG. 22.

FIG. 26 is a cross-sectional view of the integrated clamping system having an integral coolant delivery barrel, taken along line E-E of FIG. 23.

DETAILED DESCRIPTION OF THE PREFERRED EMBODIMENT

Figure 6:
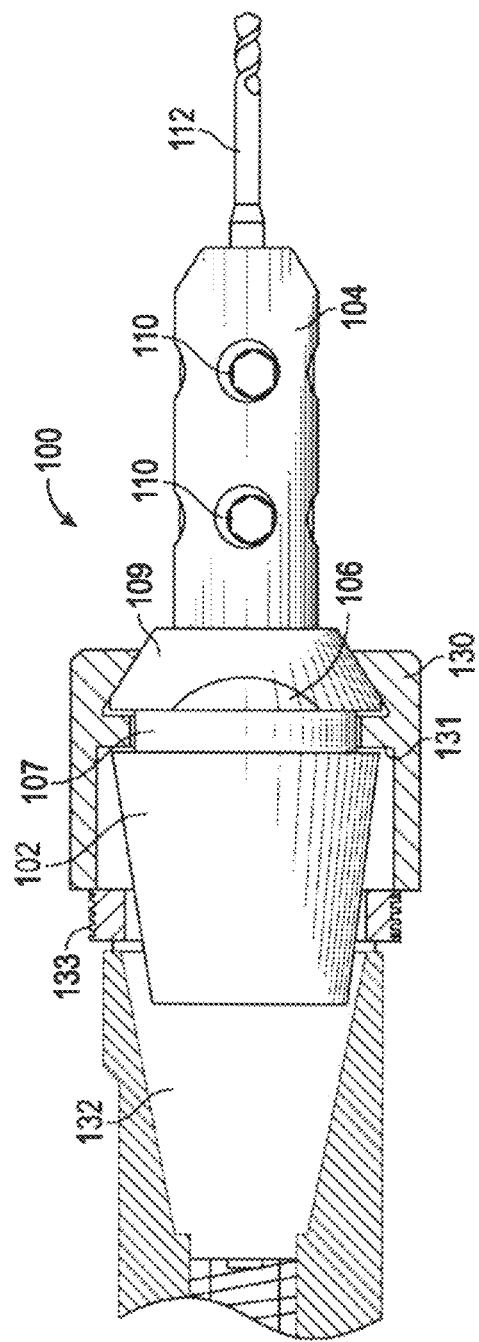
FIG. 6 is a side cross-sectional view of the integrated clamping system being received in a female holding fixture of a machine tool in accordance with an embodiment of the present invention.
Figure 7:
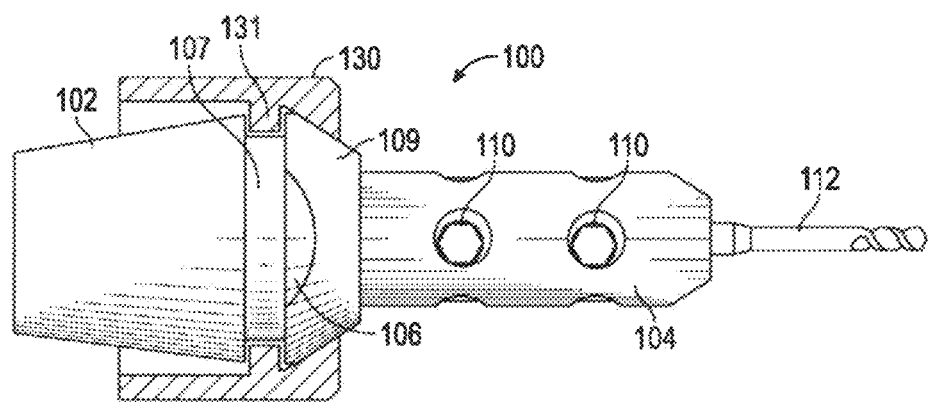
FIGS. 7-9 illustrate the engagement of a cam nut with the integrated clamping system in accordance with an embodiment of the present invention.

With reference to FIGS. 1-4, an integrated clamping system is shown. As shown therein, the integrated clamping system 100 includes a male locating taper 102 and a tool holder 104 integrally formed with the male locating taper. The male locating taper 102 is dual-angled and is generally similar in shape and angle to the dual-angle collet 14 described above. The male locating taper 102 also has truncated clearance portions 106 located on the nose 109 thereof, and a circumferential groove 107, which will be discussed in detail hereinafter.

As shown in FIGS. 1-4, the tool holders 104 have different configurations depending on the type of tool being used. For example, FIG. 1 shows the integrated clamping system 100 being utilized in conjunction with an end mill tool 108. As shown therein, the end mill 108 is slidably received in a bore in the tool holder 104 and held in place by one or more set screws 110. FIG. 2 shows the integrated clamping system 100 being utilized in conjunction with a drill bit 112. As with the end mill 108, the drill bit 112 is slidably received in the bore in the tool holder 104 and is held in place by set screws 110.

FIG. 3, shows the integrated clamping system 100 being utilized in conjunction with a saw arbor 114. As shown therein, the tool holder 104 is of a somewhat different configuration than that used with the end mill 108 and boring bar 112, and has a nut 116 which secures the saw arbor 114 to the tool holder 104. Likewise, FIG. 4 illustrates the clamping system 100 being utilized in conjunction with an insert tool 118. The insert tool 118 may be secured to the tool holder 104 through a screw or clamp 120.

FIGS. 5A-5C also illustrate the integrated clamping system 100 with various other cutting and milling tools.

Turning now to FIG. 6, the manner in which the integrated clamping system 100 is utilized to secure a cutting tool, in this case boring bar 112, to a machine is shown. As shown therein, the tool holder 104 receives and secures the boring bar 112 therein via set screws 112. A nut 130 is placed over the tool holder 104 and the male locating taper 102 such that the cam lobes 131 inside of the cam nut 130 are received in the circumferential groove 107 of the male locating taper 102. The male locating taper 102 is then inserted into the correspondingly shaped female holding fixture 132 of a machine. The cam nut 130 also includes internal threads (not shown) that are received by external threads 133 on the holding fixture 132. As such, the cam nut 130 is then tightened to secure the clamping system 100, and thus the cutting tool, to the machine.

As will be readily appreciated, without the flexibility a spring collet offers, the solid construction of the integrated clamping system 100 provides no give for the locking lobes on the cam nut to slip past the nose 109 during installation. In consideration of this issue, the male locating taper 102 is provided with truncated portions 106 on the nose 109 of the male locating taper 102 in front of the circumferential groove 106 that are semi-elliptical in shape, as discussed above.

Figure 8A:
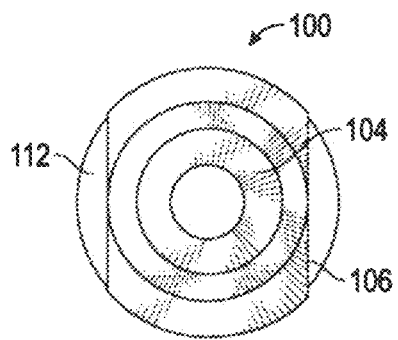
Figure 8B:
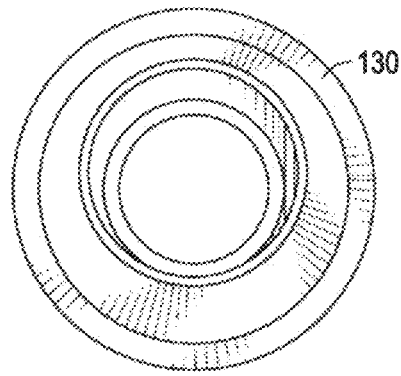
Figure 8C:
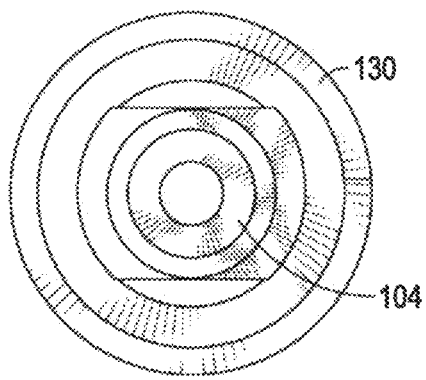
Figure 9:
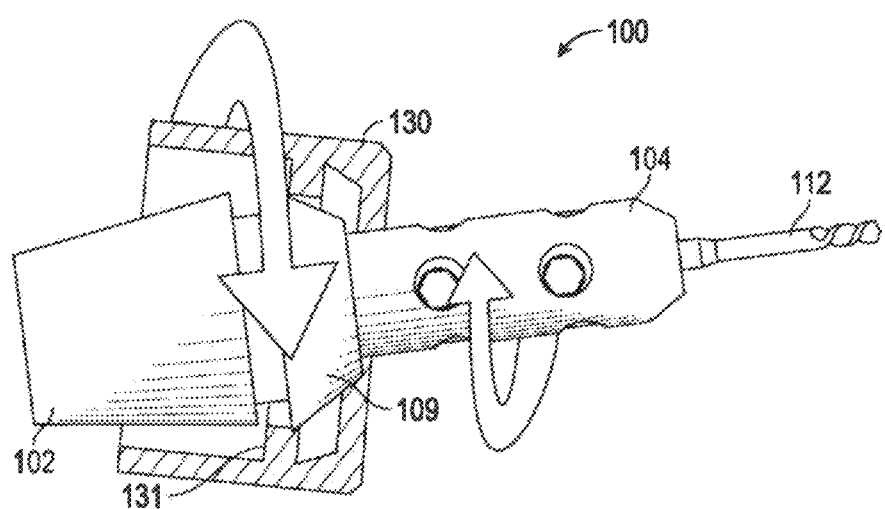

With reference to FIGS. 7 and 8A-8C, by aligning the truncated portions 106 with the relieved portion of the cam nut 130, the two parts are able to slip together, as best shown in FIGS. 8A-8C. Notably, this configuration allows the integrated clamping system 100 to be utilized with existing machines, and with existing cam nuts, as discussed previously, thereby providing for seamless integration with existing machines. In particular, this configuration allows the use of a standard cam nut, which in most cases is provided with the machine tool from the machine builder or collet sleeve manufacturer.

Figure 10:
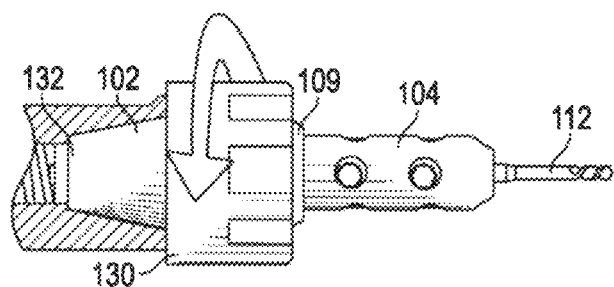
FIGS. 10-12 illustrate the removal of the integrated clamping system from a machine tool in accordance with an embodiment of the present invention.
Figure 11:
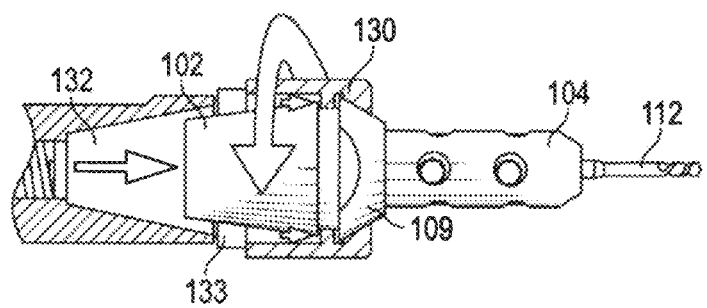
Figure 12:
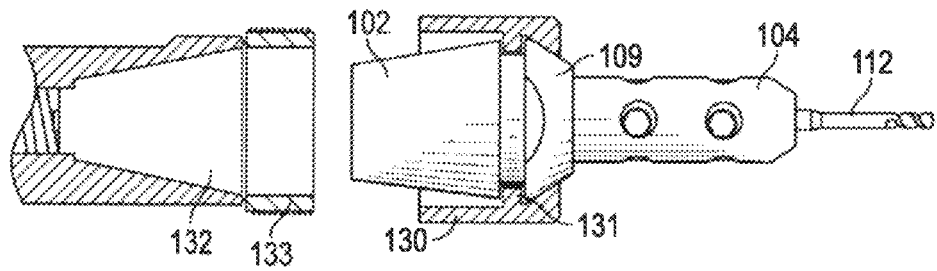
Figure 13:
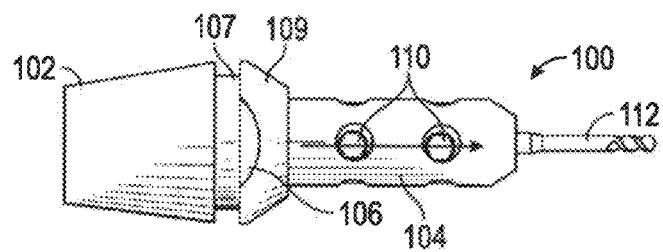
FIGS. 13-16 illustrate variations in the specifications of the integrated clamping system in accordance with an embodiment of the present invention.
Figure 14:
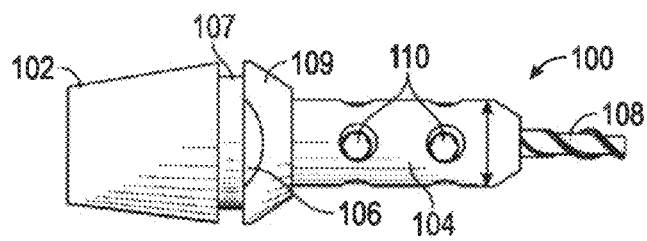
Figure 15:
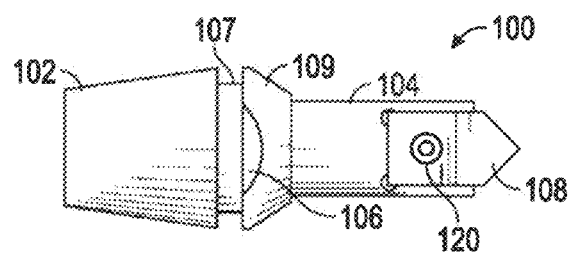
Figure 16:
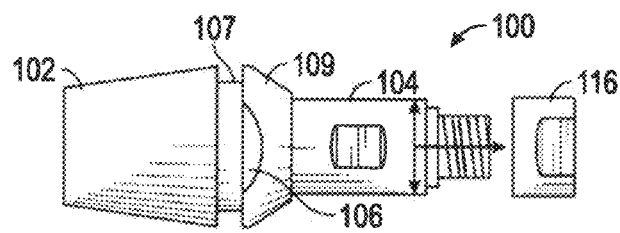

With reference to FIGS. 10-12, removal of the clamping system 100 from the female holding fixture 132 of the machine is shown. Importantly, the integrated clamping system 100 incorporates a circumferential groove 107 similar to the groove in existing spring collets for the purpose of extracting the male locating taper 102 from the corresponding female holding fixture 132. As shown therein, when the cam nut 130 is rotated slightly, the cam lobes 131 engage with the front face of the groove 107 providing the means of breaking the mated surfaces of the male locating taper 102 and female holding fixture 132 free of each other during extraction, thereby allowing the male locating taper 102 to be removed from the female holding fixture 132.

Referring again to FIGS. 1-4, the longitudinal extent of the tool holder 104 serves two functions. First, as discussed previously, it provides the physical means of holding the cutting tool, whether it be by means of a mounting hub and nut, as shown in FIG. 3 for holding a slitting saw 114, a pocket and screw or clamp to hold an indexable insert 118, as shown in FIG. 4, or by use of a bore and set screw 110 for holding end mills 108 and other round shank tools, as shown in FIGS. 1 and 2. It may also provide the physical means of holding the cutting tool by way of a groove and clamp for holding non-round shaped tool shanks, by hydraulic clamping, or shrink fit clamping. In an embodiment, this would also include holding two separate tools in one system such as a slitting saw and an end mill by combining the two fixture methods on a single unit, such as a combination saw arbor.

In an embodiment, variations in the distal end of the tool holder 104 can be utilized to accommodate various tool sizes and various extended length requirements. In other words, as the diameter of the end mill changes, the receiving bore in the tool holder 104 must also change. As the mounting hole of a slitting saw changes, the mounting hub must also change. When two slitting saws are stacked with a spacer between for gang milling, the mounting hub configuration may be different. On saw arbors, wear spacers may be utilized to prevent wear of the locating flanges. When indexable and throw inserts are used different pocket configurations and holding mechanisms can be altered as needed. When greater reach is required to clear an obstruction or to reach deeper inside of a part, the extension length of the tool holder 104 may be changed. Such variations of the tool holder 104, such as the tool holder diameter and length, are illustrated.

Figure 17:
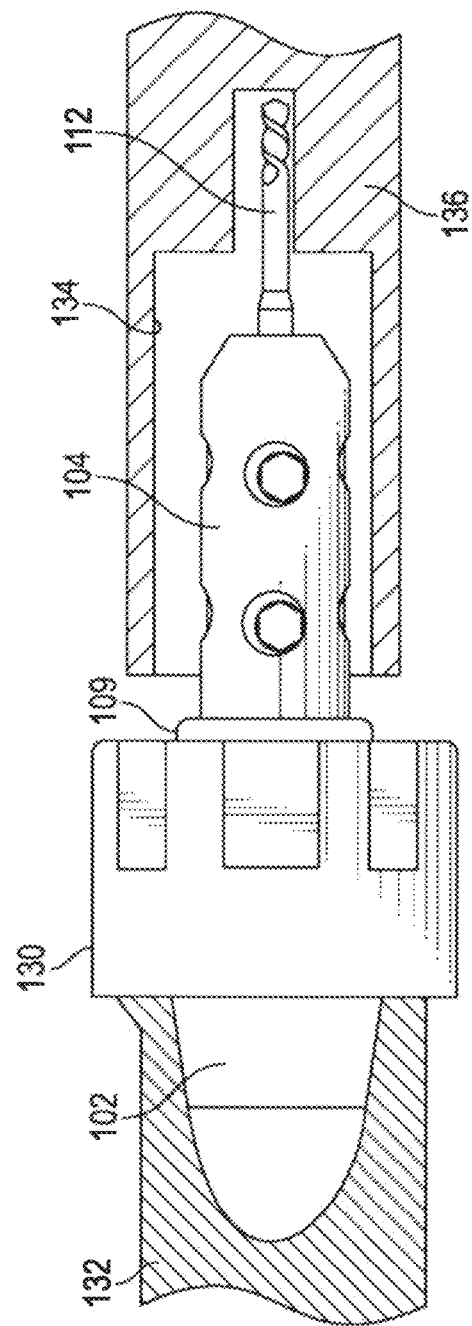
FIG. 17 illustrates the extended nose of the integrated clamping system being used to machine a workpiece in a tight space.
Figure 18:
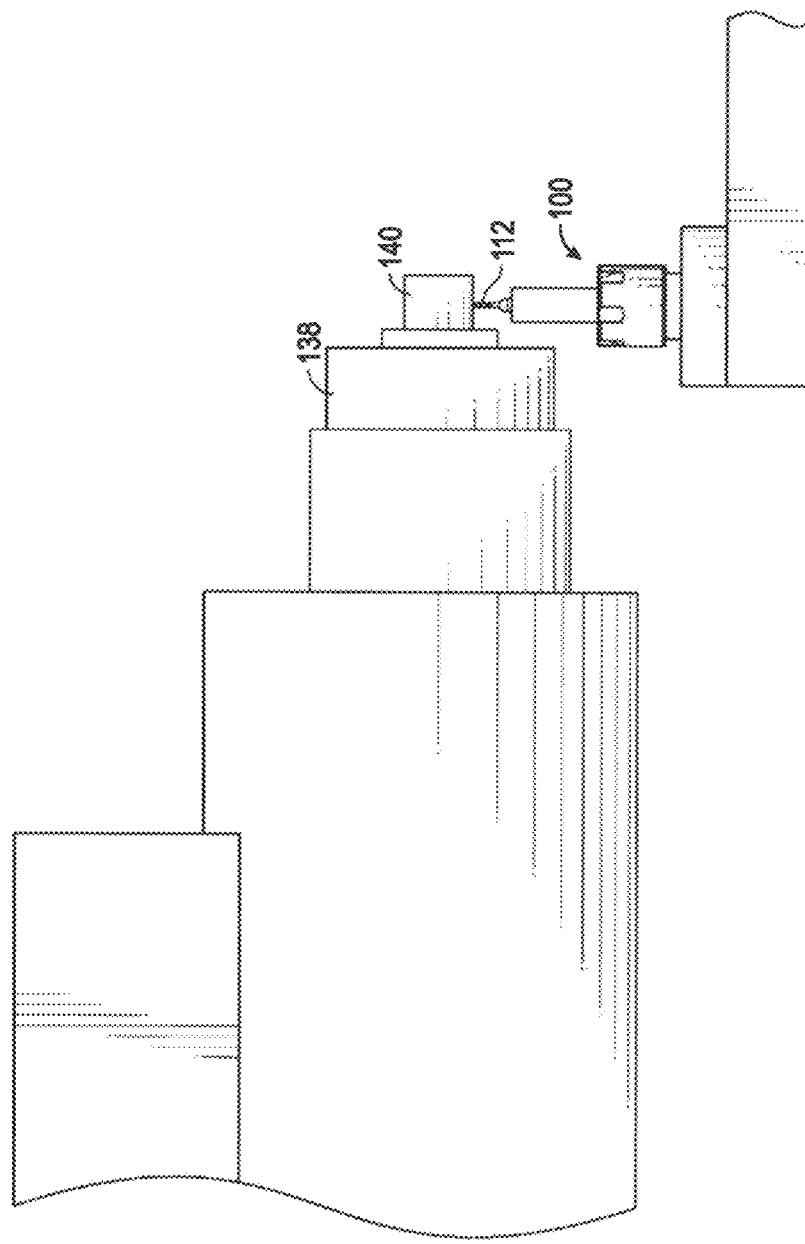
FIG. 18 illustrates the clamping system of the present invention and the manner in which it avoids interference.

Importantly, the longitudinal extent of the tool holder 104 also functions to move the cutting tip of the cutting tool farther away from the holding cam nut 130. This allows the cutting tool to reach deep inside of parts with a pre-existing bore 134 of a workpiece 136 where smaller tool operations are necessary and added tool support is required, as shown in FIG. 17. In addition, existing clamping systems may be prone to interference with portions of the machine, such as with a spindle or sub-spindle. As shown in FIG. 18, however, the clamping system 100 allows the tool 112 to reach the workpiece 140 and avoid interference with the spindle or sub-spindle or other portions of the machine.

An example of tight areas of the machine can be found on machines like Swiss-type machines, also referred to as sliding head stock machines, guide bushing machines, and automatic screw machines. In such a Swiss-type machine, the workpiece is supported by a guide bushing support. Many of these machines are also equipped with a sub-spindle to perform subsequent operations automatically after the parts are transferred from the primary operation holding device. When milling, drilling or other various operations are performed in a rotating tool position, they are generally held by a spring collet and the cam nut. As the tool diameter is reduced (e.g., a ⅛" diameter end mill), tool rigidity decreases and tool deflection increases as the working part of the tool is extended out of the holding collet in order to clear obstructions. These obstructions generally would be the large diameter of the guide bushing housing or sub-spindle or other part of the machine. Therefore, without expanding the tool the cam nut would crash into the guide bushing or sub-spindle. The integrated clamping arrangement described herein solves these problems by providing an integrated clamping system having an extended tool holder 104. The length of the tool holder 104 provides extension of the cutting tool in order to keep these larger parts of the machine from contacting one another.

As will be readily appreciated, the integrated clamping system 100 provides a simplified design in which the locating taper 102 and the tool holder 104, be it a saw arbor tool holder, insert holder, or cutting tool extension are a single, integrated component. In addition, the integrated clamping system 100 provides for increased rigidity, in that greater cutting stability is achieved by eliminating multiple components that can flex or move as a result of vibration. The male locating taper 102 is locked with the female holding fixture 132, directly, and cutting vibration is dampened as a result of the increased rigidity of the system, as a whole. This results in the reduction of harmonic vibration during the machining process, as well as increased too life.

In addition to the above-described advantages, the integrated clamping system 100 provides for increased accuracy by eliminating tolerance stack-up of multiple components. Concentricity during rotational operations is also improved, thereby enabling more accurate machining results. Esthetics quality is also improved as a result of smoother surface finish on the workpiece due to the reduction of harmonic vibration.

Moreover, productivity gains may be realized with more uniform and efficient cutting. As will be readily appreciated, the increase of tool life enables the machine to remain in production for longer periods of time with fewer tool changes of dull tools. Additionally, further gains in productivity can be realized with the benefit of increased cutting velocity, which is possible by reducing harmonic vibrations.

Importantly, the integrated clamping system 100 provides a repeatable solution for quickly changing tools into a fixed location. Positioning variables are eliminated by replacing the spring collet of prior art clamping mechanism and the separate tool holder shank with the integrated clamping system's solid body which is rigidly fixtured to positive stop surfaces. In particular, the body portion (defined by the male locating taper 102, nose 109 and groove 107) is substantially rigid. As used herein, "substantially rigid" means that the body portion of the clamping system cannot be compressed or expanded in a direction substantially perpendicular to the axis of rotation when inserted into the female holding fixture and secured in place by a cam nut. This is in contrast to existing spring collets which can be compressed or expanded to accommodate a tool directly therein and to lock the tool to a machine. In addition, with the integrated clamping system 100, tools can be preset outside of the machine with predictable tool setup results.

Figure 19:
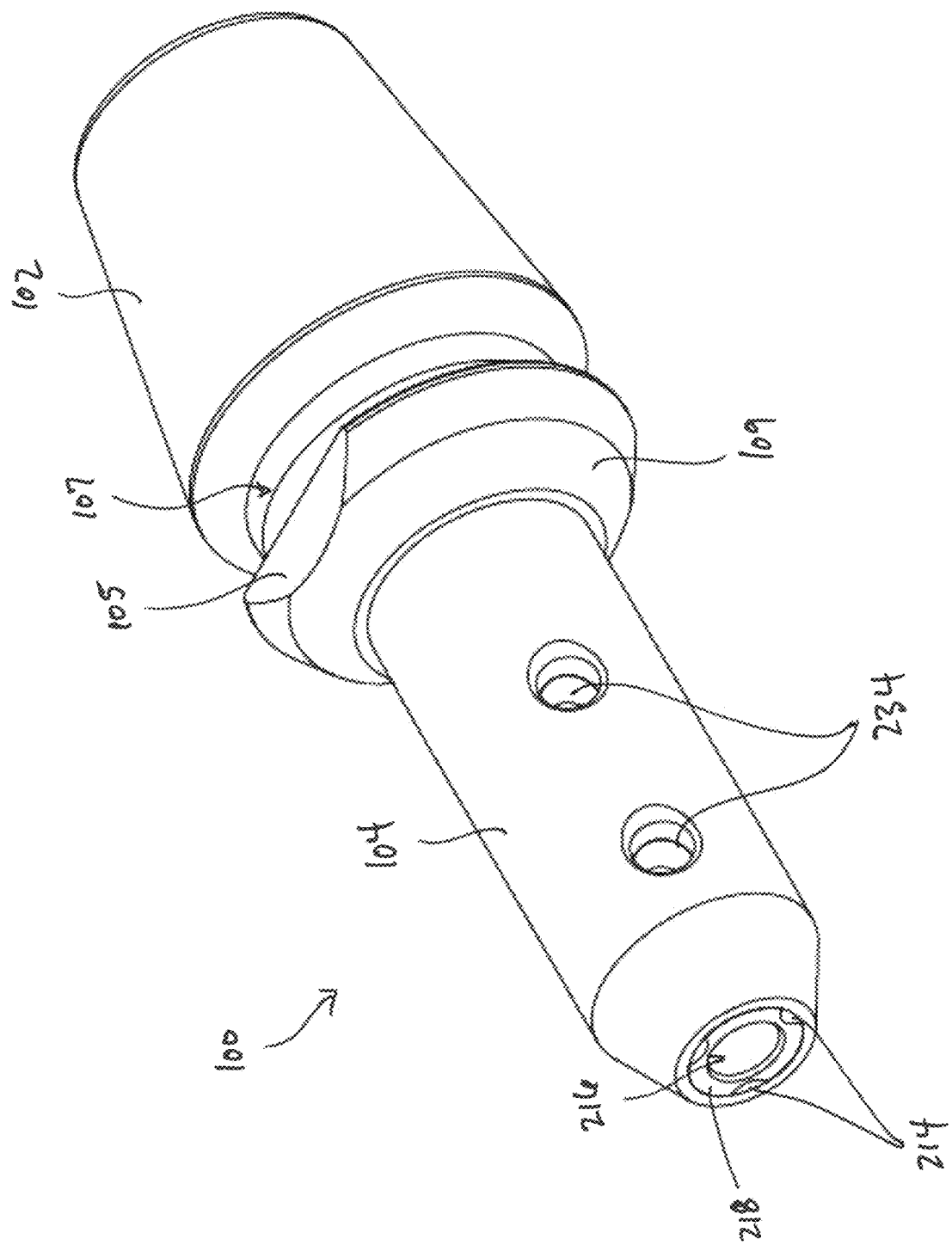
FIG. 19 is a perspective view of an integrated clamping system having an integral coolant delivery barrel providing veins for the delivery of cooling or lubricating fluid, according to another embodiment of the invention.
Figure 20:
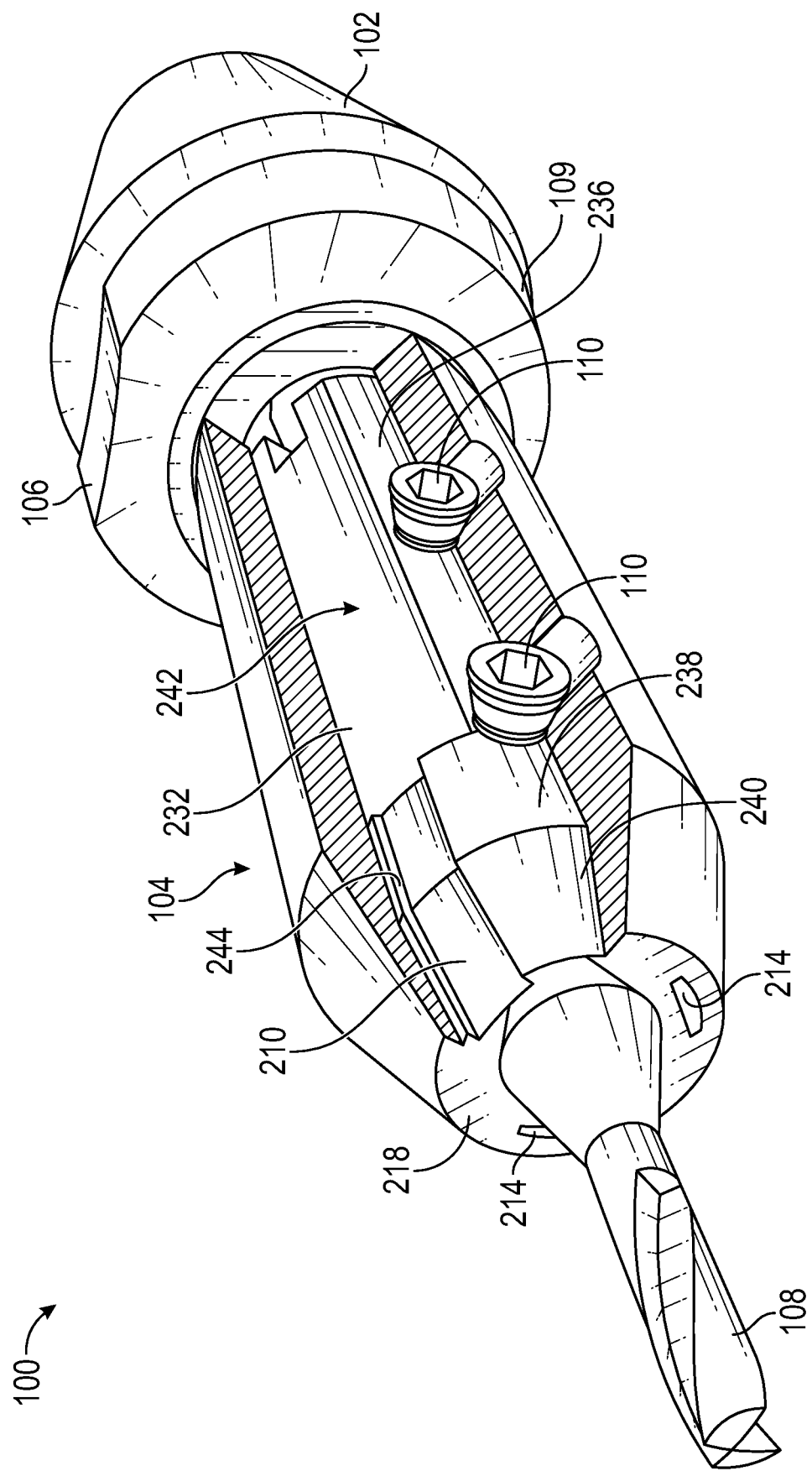
FIG. 20 is a partial cross-sectional, perspective view of the integrated clamping system of FIG. 19 showing the delivery veins.

Turning now to FIGS. 19-30, in an embodiment, the integrated clamping system 100 may additionally include a means for providing coolant to the tool-workpiece interface in order to maintain the workpiece at a stable temperature, maximize the life of the cutting tool by lubricating the working edge and reducing tip welding, and to prevent rust on machine parts and cutters. As best shown in FIGS. 19, 20 and 25, in an embodiment, the tool holder 104 may include one or more internal fluid flow channels or delivery veins 210. The delivery veins 210 extend from a rearward end of the tool holder 104 where they are in fluid communication with a hollow cavity 212 extending through the male locating taper 102, to corresponding outlets 214 in a forward face 218 of the tool holder 104. In embodiments where a tool is concentrically fixed within a chuck or mounting bore 216 of the tool holder 104 (e.g., like the mounting bore 216 for end mill 108 shown in FIGS. 22, 25 and 26), the outlets 214 may surround and be radially spaced from the mounting bore 216. In the preferred embodiment, there may be three internal veins 210 and corresponding outlets 214 arranged concentrically with an axis of the tool holder 104 and equally spaced around the mounting bore 216.

As shown in FIGS. 20, 25 and 26, in an embodiment, the tool holder 104 may be formed as a two-piece structure having an outer sleeve 230 integrally formed with the nose 109 of the locating taper 102, and an inner sleeve defining a coolant delivery barrel 232 received within the outer sleeve 230 and having the mounting bore 216 for receiving a cutting tool such as end mill 108. As shown therein, the tool holder 104 (including the outer sleeve 230 and inner coolant delivery barrel 232) is formed with throughbores 234 (such as, for example, threaded bores) for receiving set screws 110 for mounting a tool within the mounting bore 216, as discussed in detail above. The throughbores 234 are preferably offset from the internal fluid delivery veins to prevent the cooling or lubricating fluid from escaping through the throughbores 234.

Figure 21:
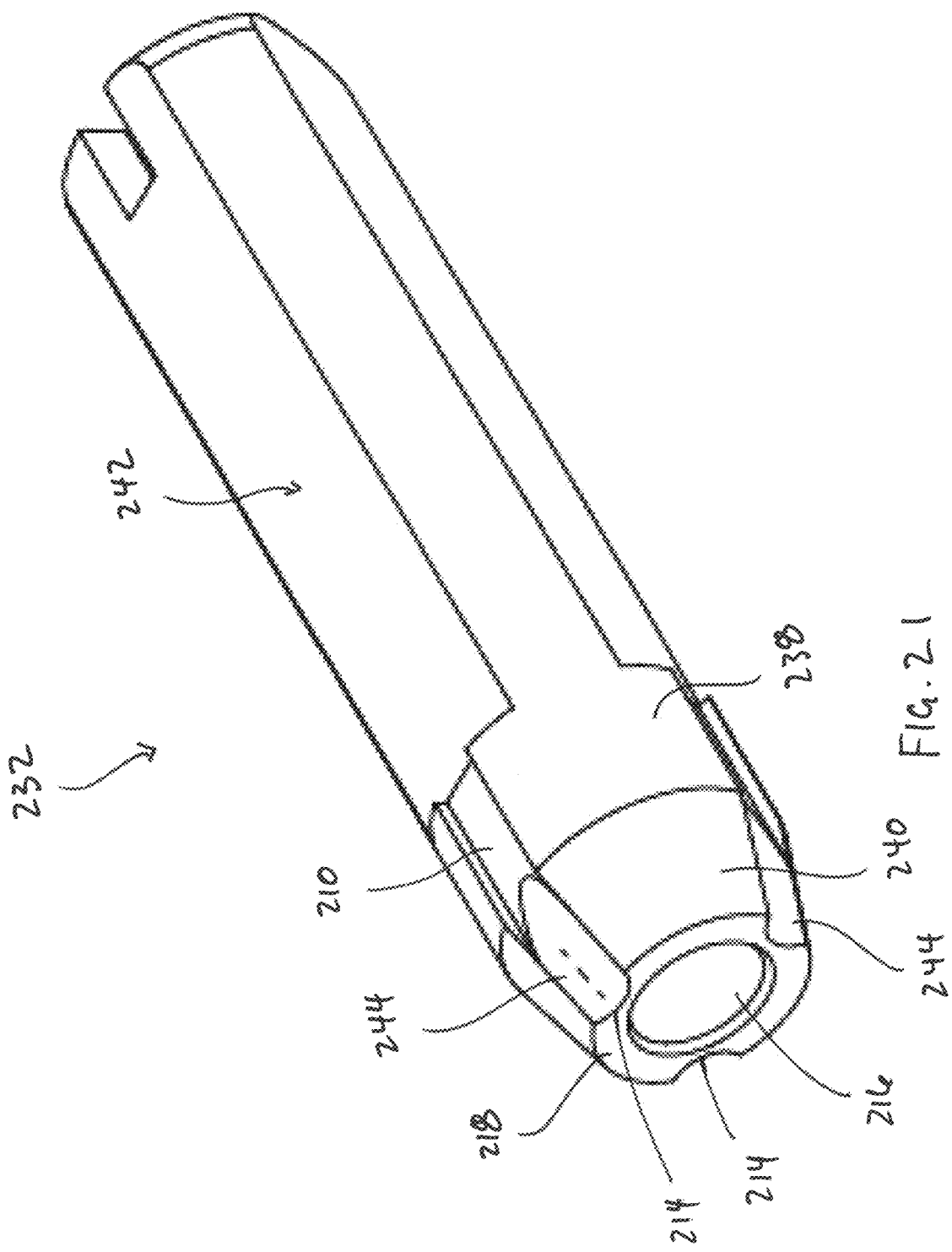
FIG. 21 is a perspective view of the coolant delivery barrel that forms a portion of the tool holder of the integrated clamping system of FIG. 19.
Figure 22:
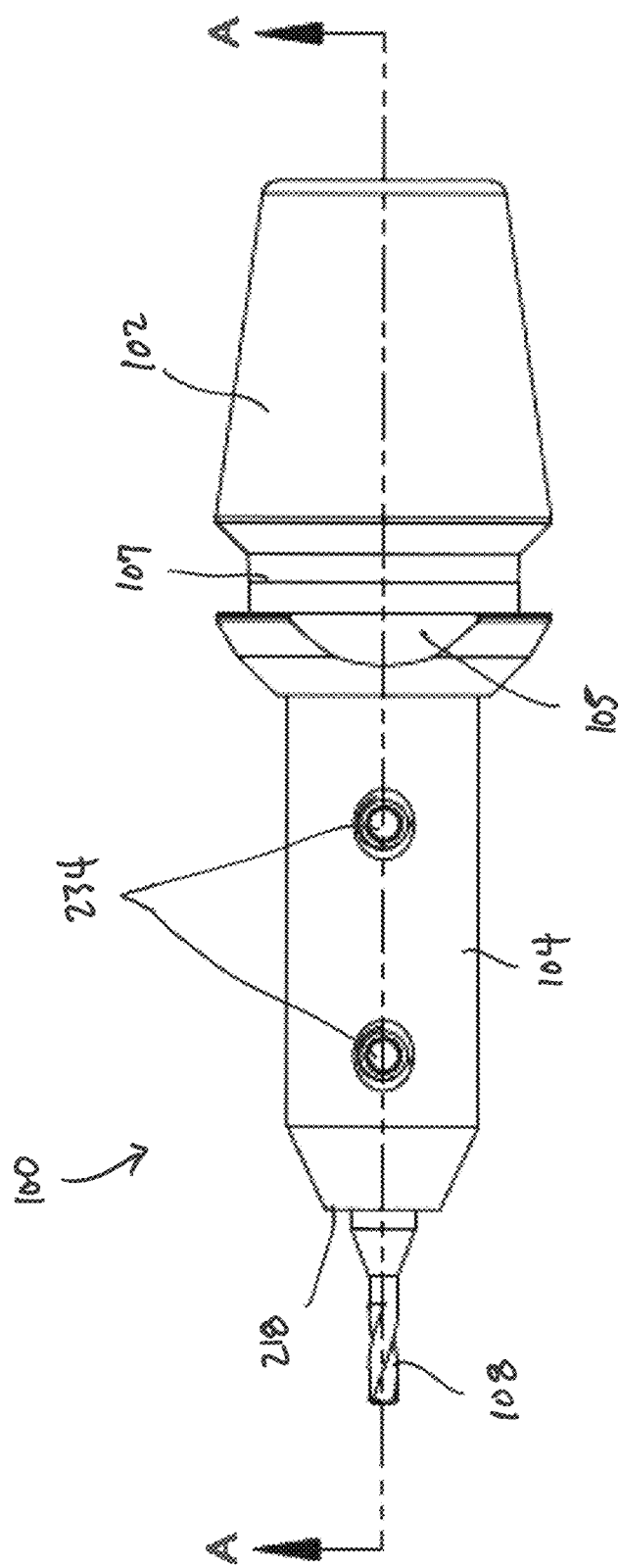
FIG. 22 is a top plan view of the integrated clamping system having an integral coolant delivery barrel of FIG. 19.
Figure 23:
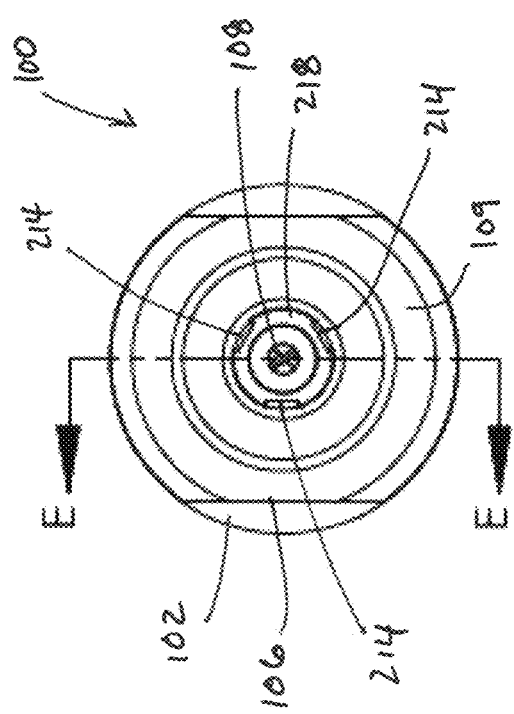
FIG. 23 is a front, elevational view of the integrated clamping system having an integral coolant delivery barrel of FIG. 19.
Figure 24:
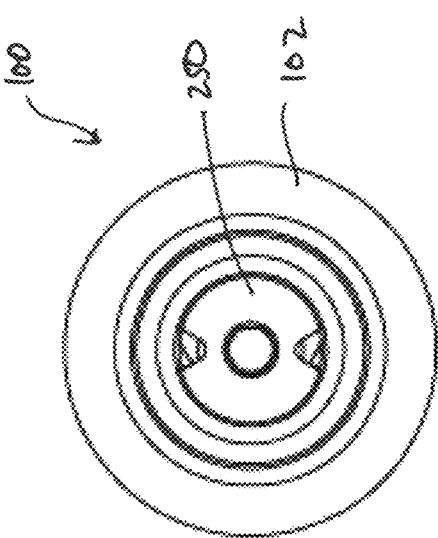
FIG. 24 is a rear, elevational view of the integrated clamping system having an integral coolant delivery barrel of FIG. 19.

With specific reference to FIGS. 20 and 21, where a two-piece structure is utilized, the inner coolant delivery barrel 232 includes a rearward body portion 236 and an intermediate body portion 238 having an outer diameter that closely corresponds to an inner diameter of the outer sleeve 230, as well as a nose 240 that likewise corresponds closely in size to the space within the nose of the outer sleeve 230. As shown therein, the outside diameter of the rearward body portion 236 is not continuous, but has flat, relieved portions 242 corresponding to each of the delivery veins 210 that interrupt the outside diameter of such body portion 236. The intermediate body portion 238 and the nose 240 of the coolant delivery barrel 232 are formed with narrower channels or grooves 244 extending from the relieved portions 242 to the outlets 214.

As shown in FIGS. 20, 25 and 26, the inner coolant delivery barrel 232 is received within the outer sleeve 230 such that the surfaces of the relieved portions 242 and grooves 244 are spaced radially inward from the inner surface of the outer sleeve 230. In this manner, the relieved portions 242 and grooves 244 define the delivery veins 210 that extend through the tool holder 104 from the locating taper 102 to the outlets 214 in the forward face 218 of the tool holder 104. In an embodiment, the coolant delivery barrel 232 may be welded, press fit, or secured utilizing other means known in the art within the outer sleeve 230. In other embodiments, the orientation of the coolant delivery barrel 232 with respect to the outer sleeve 230 may be fixed by the set screws 110 that extend through the aligned bores 234.

While the present invention has been shown and described as a two-piece structure, it is contemplated that the tool holder may be formed as a unitary structure having internal fluid delivery veins 210. For example, in an embodiment, the tool holder and/or the entire clamping system 100 may be formed utilizing 3D printing or other additive manufacturing methods.

Referring specifically to FIGS. 25 and 26, in an embodiment, the integrated clamping system with integral coolant delivery barrel 232 may also include a set screw 250 positioned within the hollow passageway or cavity 212 of the locating taper 102. The set screw 250 may, for example, be externally threaded for engaging a correspondingly threaded portion of the cavity 212 or passageway in the taper 102. Importantly, the set screw 250 functions as a dead stop for the tool 108 to locate against for a repeatable position.

Figure 29:
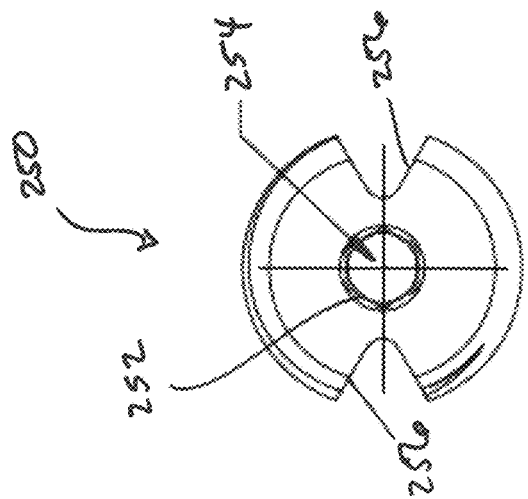
FIG. 29 is a rear elevational view of the set screw of FIG. 27, showing the coolant flow passages.
Figure 27:
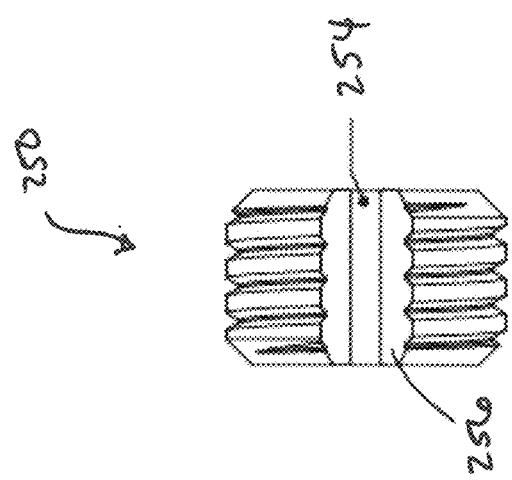
FIG. 27 is a side elevational view of a set screw of the integrated clamping system of FIG. 19.
Figure 28:
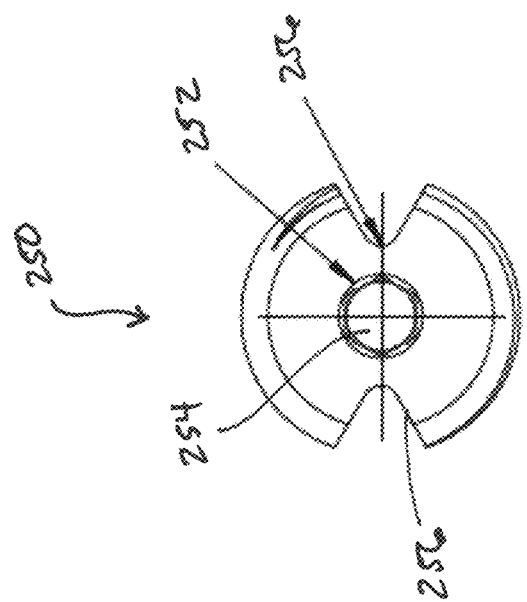
FIG. 28 is a front elevational view of the set screw of FIG. 27, showing coolant flow passages.

As illustrated in FIGS. 27-29, the set screw 250 has a special configuration that allows cooling or lubricating fluid to flow past the set screw 250 an enter the delivery veins in the tool holder 104 portion of the clamping system. As shown therein, the set screw 250 includes a socket adjusting feature or driver 252 at both ends, as well as a central through hole 254 that enables coolant or lubricant to pass through the set screw 250. The set screw 250 may further include an additional slot or longitudinal groove 256 formed in the outer surface of the set screw 250, which enable coolant or lubricant to pass by the set screw 250 (particular for use with non-through coolant tool bits).

Figure 30:
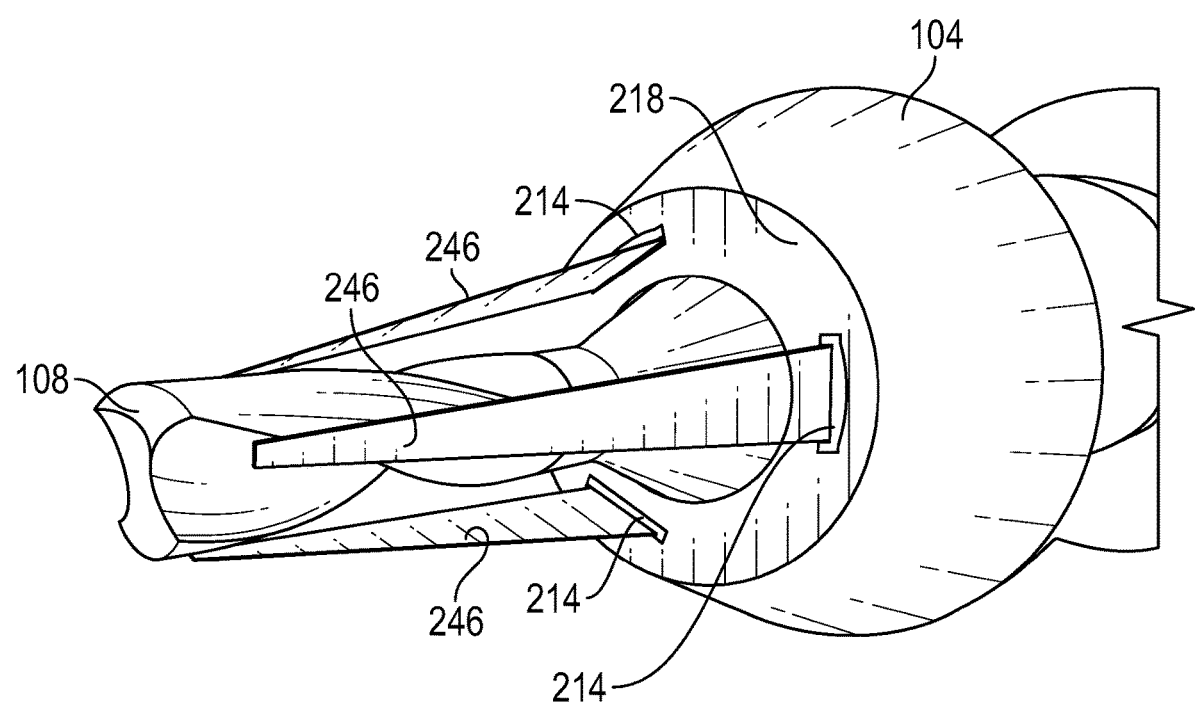
FIG. 30 is an enlarged, perspective view of the forward end of the integrated clamping system of FIG. 19, illustrating delivery of coolant to the cutting tool.

In an embodiment, as best shown in FIG. 30, the outlets 214 in the forward face 218 of the tool holder have a substantially elliptical shape (having a width that is much greater than a height). As shown therein, this shape produces a stream of cooling or lubricating fluid to be projected towards the tool-workpiece interface from the outlets 214, as discussed hereinafter. As also shown therein, the outlets 214 may be angled relative to the longitudinal axis of the tool so that that respective fluid streams converge upon or impinge upon the tool-workpiece interface. While the outlets 214 are illustrated as being substantially elliptical in shape, other shapes, orientations and delivery angles are also possible. In particular, the delivery veins can alternatively be flat, radial, oval, rectangular or round, and may be fixed at different angles depending on the specific length of the tool utilized so that they project a coolant stream to a desired location on the tool itself, the workpiece, or the tool-workpiece interface.

In either embodiment, in operation, cooling or lubricating fluid may enter the clamping system/device 100 at the rear of the male locating taper 102 from a machine (not shown) having a complimentary female holding fixture 132. In particular, a fluid pumping or circulating system may pump a cooling or lubricating fluid from the machine, through the female holding fixture 132 and into the male locating taper 102, from which it flows through the delivery veins 210 and out of the outlets 214 surrounding the cutting tool. The pressure of the fluid causes the fluid to be projected as fluid streams 246 around the outside of the cutting tool, to the tool-workpiece interface, as best shown in FIG. 30.

Figure 34:
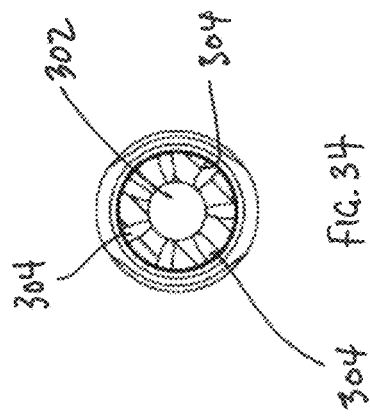
FIG. 34 is a cross-sectional view of the clamping and cooling system of FIG. 32, taken along line B-B of FIG. 32.
Figure 33:
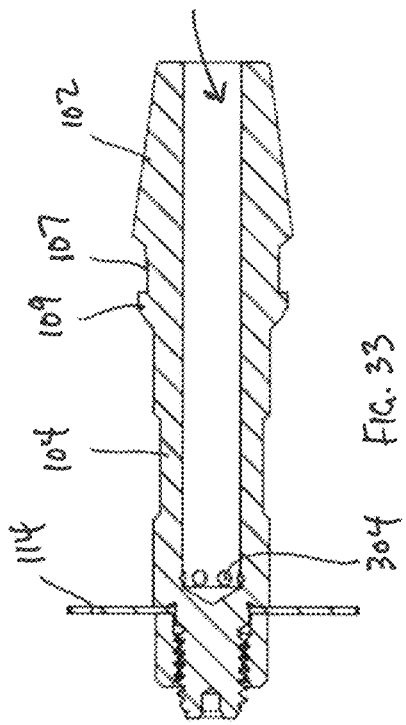
FIG. 33 is a cross-sectional view of the clamping and cooling system of FIG. 32, taken along line A-A of FIG. 32.
Figure 32:
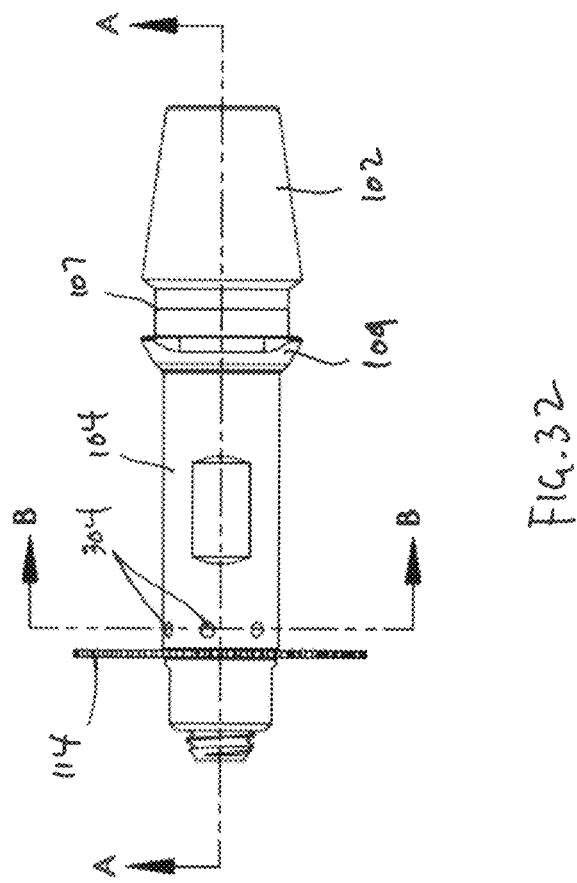
FIG. 32 is a side elevational view of the clamping and cooling system f of FIG. 31.

While the cooling/lubricating system of the integrated clamping system shown and described herein is particularly suited for machine tools mounted coaxially with the tool holder 104 and locating taper 102 (e.g., the end mill 108 of FIG. 1 and drill bit 112 of FIG. 2), certain modifications can be made to provide for coolant or lubricant delivery to a variety of machine tools. For example, to provide cooling/lubricating functionality where a saw arbor 114 is utilized (see FIG. 3), the fluid delivery vein 210 through the tool holder 104 will extend to a longitudinal point adjacent to the saw arbor 104 (or other saw), where radial apertures or cross-holes around the circumference of the tool holder 104 direct the fluid/lubricant to the tool-workpiece interface. FIGS. 30-33 illustrate a similar configuration for providing cooling to a saw arbor. As illustrated therein, a longitudinal bore 302 extends through the locating taper 102 and the tool holder 104 to a point just shy of the saw arbor 114. At that point, radial apertures 304 extend from the bore 302 radially outward through the outer surface of the tool holder 104. As best illustrated in FIG. 34, the radial apertures 304 are spaced equidistantly about the tool holder 104. In an embodiment, the apertures 304 may be formed at a slightly forward angle (towards the distal end of the tool holder 104) to direct cooling or lubricating fluid to the saw arbor-workpiece interface. In such an embodiment, the cooling fluid or lubricant would be propelled out of the tool holder 104 centrifugally.

Figure 31:
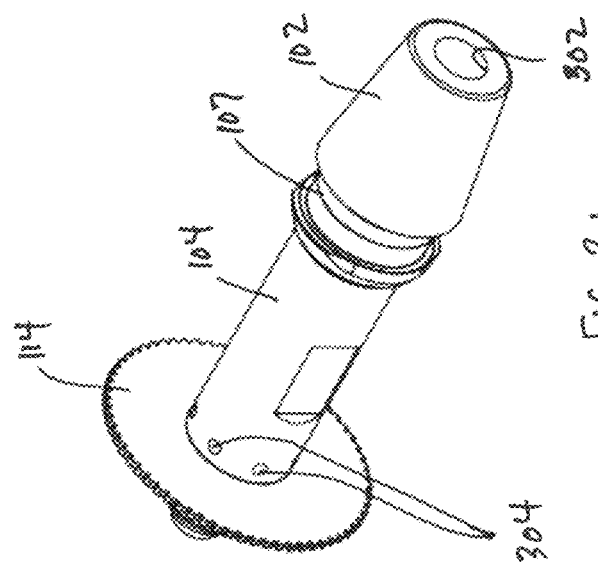
FIG. 31 is a perspective view of an integrated clamping and cooling system for a saw arbor, according to an embodiment of the invention.

In an embodiment, where the machine tool is a combination arbor and end mill, the tool holder 104 may include both apertures in the forward face 218 of the tool holder, as shown in FIG. 19, as well as radial apertures rearward of the saw arbor 114, as shown in FIG. 31. Fluid may then be pumped through the locating taper 102, through the delivery veins 210 in the tool holder, and out both of the apertures 214 and 304 to deliver cooling/lubricating fluid to both the end mill-workpiece interface and the saw-workpiece interface.

In the case of the insert tool 118 of FIG. 4, the fluid delivery vein 210 would deliver the coolant/lubricant to a forward aperture configured specifically to provide the fluid to the tool/workpiece interface.

Importantly, the integrated cooling system of the present invention, and the fluid delivery veins that form a part thereof, help to maintain the workpiece at a stable temperature, maximize the life of the cutting tool by lubricating the working edge and reducing tip welding, as well as help to prevent rust on machine parts and cutters. As a result of these advantages, cutting speeds may be increased, allowing for more precise cutting while simultaneously achieving increased throughput. More specifically, as a result of the integrated nature of the clamping system 100 (i.e., it is formed as a integral, unitary component) and the cooling mechanism integrated therewith, the present invention minimizes vibration and tool loosening, and maintains workpieces and cutting tools at stable temperatures. Indeed, it is the integral nature of the clamping system (i.e., the tool holder and locating taper being a unitary part) that enables cooling/lubricating fluid to be delivered through the device to the tool-workpiece interface, which has proven difficult with prior art, multi-component clamping systems. This particular combination of features allows precise machining operations to be carried out at high production rates, to an extent heretofore not seen in the art. That is, the unitary nature of the system minimizes vibration and thus machining precision, while the lubricating and cooling facilitated by the integrated delivery veins ensures that workpiece and tool temperatures are maintained at stable temperatures, thus providing for higher production rates to be realized.

While the present invention has been described in connection with Swiss-type machines, the clamping system 100 and cooling system described herein may also be utilized in conjunction with any type of machine tool known in the art including, but not limited to, milling machines and turning machines. In addition, the clamping system may be utilized on machines requiring both power rotating tools and static tool operations.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A clamping system for machine tools, comprising:
a body portion configured to be received in a holding fixture of a machine, said body portion including a hollow passageway;
a tool holder having an outer sleeve integrally formed with and extending longitudinally from said body portion, said tool holder being elongate and having a largest outside diameter that is less than a smallest outside diameter of the body portion, and having a mounting bore in an end thereof which defines a portion of the tool holder that directly receives a cutting tool;
a plurality of fluid delivery veins extending through said tool holder from said body portion to said end; and
a plurality of outlets in said end, each of said plurality of outlets corresponding to a respective one of said plurality of fluid delivery veins;
a set screw threadedly received within the hollow passageway, said set screw forming a dead stop configured to limit an insertion depth of said cutting tool;
wherein each of said plurality of outlets is configured to direct a flow of fluid from a respective one of said plurality of fluid delivery veins in a direction towards a cutting tool-workpiece interface;
wherein said dead stop includes a central clearance portion and at least one clearance slot in a peripheral surface of the set screw, the central clearance portion and the at least one clearance slot each extending an entire length of said set screw, said central clearance portion and said at least one clearance slot allowing for said fluid to pass through said hollow passageway, past said set screw, and into said plurality of fluid delivery veins;
wherein said central clearance portion and said at least one clearance slot are fluidly isolated from one another throughout said entire length of said set screw.

2. The clamping system of claim 1, wherein:
each of said plurality of outlets is substantially elliptical in shape.

3. A clamping system for machine tools, comprising:
a body portion configured to be received in a holding fixture of a machine, said body portion including a hollow passageway;
a tool holder extending longitudinally from said body portion, said tool holder being elongate and having a mounting bore in an end thereof for receiving a cutting tool;
a plurality of fluid delivery veins extending through said tool holder from said body portion to said end; and
a plurality of outlets in said end, said plurality of outlets being in fluid communication with at least one of said plurality of fluid delivery veins, said plurality of outlets being configured to direct a flow of fluid from said plurality of fluid delivery veins in a direction towards a cutting tool-workpiece interface;

a set screw threadedly received within said hollow passageway of said body portion, said set screw forming a dead stop configured to limit an insertion depth of said cutting tool;

wherein said dead stop includes a central clearance portion and at least one clearance slot in a peripheral surface of the set screw the central clearance portion and the at least one clearance slot each extending an entire length of said set screw, said central clearance portion and said at least one clearance slot allowing for said fluid to pass through said hollow passageway, past said set screw, and into said plurality of fluid delivery veins;

wherein said central clearance portion and said at least one clearance slot are fluidly isolated from one another throughout said entire length of said set screw.

4. The clamping system for machine tools, comprising of claim 3, wherein:

said body portion includes a male locating taper, a nose having a taper angled opposite of said male locating taper and pair of opposed clearance portions, and a circumferential groove intermediate said male locating taper and said nose, said groove separating said taper of said nose from said male locating taper, said pair of opposed clearance portions are configured to allow insertion of a cam nut onto said body portion, and said circumferential groove is configured to receive cam lobes of said cam nut.

5. The clamping system of claim 3, wherein:
said end of said tool holder is a face of said tool holder that receives said cutting tool.

6. The clamping system of claim 5, wherein:
each fluid delivery vein of said plurality of fluid delivery veins includes a corresponding outlet of saidplurality of outlets.

7. The clamping system of claim 6, wherein:
said plurality of fluid delivery veins is three fluid delivery veins; and said plurality of outlets is three outlets.

8. The clamping system of claim 3, wherein:
each outlet of said plurality of outlets is elliptical in shape.

9. The clamping system of claim 8, wherein:
each outlet of said plurality of outlets is angled with respect to a longitudinal axis of said tool holder.

10. The clamping system of claim 9, wherein:
each outlet of said plurality of outlets is angled towards said longitudinal axis of said tool holder.

11. The clamping system of claim 3, wherein:
said clamping system is formed by additive manufacturing and is a unitary component.

12. The clamping system of claim 3, wherein:
each fluid delivery vein of said plurality of fluid delivery veins is in fluid communication with the hollow passageway that extends through said body portion.

13. The clamping system of claim 3, wherein:
a position of the set screw is adjustable.

* * * * *